(12) United States Patent
Lines et al.

(10) Patent No.: US 6,899,955 B2
(45) Date of Patent: May 31, 2005

(54) ANTIFOULING COATING COMPOSITION COMPRISING A FLUORINATED RESIN

(75) Inventors: Robert Lines, Northumberland (GB); David Neil Williams, Newcastle upon Tyne (GB); Stefano Turri, Milan (IT)

(73) Assignees: International Coatings Limited, London (GB); Ausimont S.p.A., Milan (IT)

( * ) Notice: Subject to any disclaimer, the term of this patent is extended or adjusted under 35 U.S.C. 154(b) by 0 days.

(21) Appl. No.: 10/297,536

(22) PCT Filed: Jun. 1, 2001

(86) PCT No.: PCT/EP01/06359

§ 371 (c)(1),
(2), (4) Date: Apr. 22, 2003

(87) PCT Pub. No.: WO01/94446

PCT Pub. Date: Dec. 13, 2001

(65) Prior Publication Data

US 2003/0161962 A1 Aug. 28, 2003

(30) Foreign Application Priority Data

Jun. 6, 2000 (EP) ............................................. 00304809

(51) Int. Cl.$^7$ ................................................ B32B 9/04
(52) U.S. Cl. ........................... 428/447; 528/26; 528/29; 528/35; 528/38; 528/42; 427/387
(58) Field of Search .............................. 528/26, 29, 35, 528/38, 42; 428/447; 427/387

(56) References Cited

U.S. PATENT DOCUMENTS

| | | | | |
|---|---|---|---|---|
| 3,702,778 | A | | 11/1972 | Mueller et al. ................. 117/75 |
| 3,950,588 | A | * | 4/1976 | McDougal .................... 442/80 |
| 4,614,667 | A | | 9/1986 | Larson et al. ................ 427/54.1 |
| 4,746,550 | A | | 5/1988 | Strepparola et al. ...... 427/385.5 |
| 4,900,474 | A | | 2/1990 | Terae et al. ................... 252/358 |
| 5,333,008 | A | | 7/1994 | Nowak et al. ............ 346/160.1 |
| 6,592,659 | B1 | * | 7/2003 | Terrazas et al. ......... 106/287.13 |
| 6,613,860 | B1 | * | 9/2003 | Dams et al. ................... 528/36 |
| 6,656,258 | B2 | * | 12/2003 | Elsbernd et al. .......... 106/287.1 |
| 6,673,397 | B2 | * | 1/2004 | Malik .......................... 427/505 |
| 6,818,688 | B2 | * | 11/2004 | Visca .......................... 524/263 |

FOREIGN PATENT DOCUMENTS

| | | | |
|---|---|---|---|
| EP | 0 251 334 B1 | 1/1988 | ........... C08G/18/50 |
| EP | 0 433 070 B1 | 6/1991 | ......... C09D/171/00 |
| EP | 0 731 125 B1 | 9/1996 | ........... C08G/65/00 |
| EP | 0 770 634 A3 | 5/1997 | ........... C08G/18/50 |
| EP | 0 770 634 A2 | 5/1997 | ........... C08G/18/50 |
| GB | 1 307 001 | 2/1973 | ............ B44D/5/08 |
| JP | 61-43668 | 3/1986 | ............ C09D/5/00 |
| JP | 4-283248 | 10/1992 | ............... C08J/7/04 |
| JP | 6-239876 | 8/1994 | ............. C07F/7/18 |
| JP | 6-322294 | 11/1994 | ............ C09D/5/14 |
| WO | WO 99/33927 | 7/1999 | ............ C09D/5/16 |
| WO | WO 99/37720 | 7/1999 | ............ C09D/4/00 |

OTHER PUBLICATIONS

International Search Report for the International Application No. PCT/EP 01/06359 dated Nov. 22, 2001.
Abstract of JP 61–43668 from EPO on–line data base esp@cenet.
Abstract of JP 4–283248 from EPO on–line data base esp@cenet.
Abstract of JP 6–239876 from EPO on–line data base esp@cenet.
Abstract of JP 6–322294 from EPO on–line data base esp@cenet.
Abstract of JP 4045170 from EPO on–line data base esp@cenet.
Patent Abstracts of Japan abstracting JP 4–283248 (1992).

* cited by examiner

Primary Examiner—Margaret G. Moore
Assistant Examiner—Marc S. Zimmer
(74) Attorney, Agent, or Firm—Lainie E. Parker

(57) ABSTRACT

A process for inhibiting the fouling of a substrate in a marine fouling environment, which comprises forming on the substrate, before exposure to the said environment, a coating comprising a curable fluorinated resin of the general formula: W-L-YFC—O—R$^f$—CFY-L-W wherein: W is a group of the general formula —Si(R$^1$)$_\alpha$(OR$^2$)$_{3-\alpha}$, wherein $\alpha$=0, 1, or 2, preferably $\alpha$=0, R$^1$ and R$^2$ independently have the meaning of linear of branched C$_1$–C$_6$ alkyl groups, optionally containing one or more ether groups, or C$_7$–C$_{12}$ aryl or alkyl groups, and preferably R$^1$ and R$^2$ are C1–C4 alkyl groups; L is an organic linking group; Y is F or CF$_3$; and R$^f$ is a group having an average molecular weight by number between 350 and 8000, preferably between 500 and 3000, and comprising repeating units having at least one of the following structures randomly distributed along the chain: —CFXO—, CF$_2$CF$_2$O—, CF$_2$CF$_2$CF$_2$O—, CF$_2$CF$_2$CF$_2$CF$_2$O—, CR$^4$R$^5$CF$_2$CF$_2$O—, —(CF(CF$_3$)CF$_2$O)—, —CF$_2$CF(CF$_3$)O—, wherein X is F or CF$_3$, R$^4$ and R$^5$ independently have the meaning of H, Cl, or C1–C4 perfluoroalkyl.

18 Claims, No Drawings

ANTIFOULING COATING COMPOSITION COMPRISING A FLUORINATED RESIN

This application is the national phase of PCT/EP01/06359, filed Jun. 1, 2001, which claims the benefit of European Patent Application No. 00304809.7, filed Jun. 6, 2000.

FIELD OF THE INVENTION

The present invention pertains to a fluorinated resin and the use thereof in antifouling coating compositions for marine applications.

BACKGROUND OF THE INVENTION

Man-made structures such as boat hulls, buoys, drilling platforms, oil production rigs, and pipes which are immersed in water are prone to fouling by aquatic organisms such as green and brown algae, barnacles, mussels, and the like. Such structures are commonly of metal, but may also comprise other structural materials such as concrete. This fouling is a nuisance on boat hulls, because it increases frictional resistance during movement through the water, the consequence being reduced speeds and increased fuel costs. It is a nuisance on static structures such as the legs of drilling platforms and oil production rigs, firstly because the resistance of thick layers of fouling to waves and currents can cause unpredictable and potentially dangerous stresses in the structure, and, secondly, because fouling makes it difficult to inspect the structure for defects such as stress cracking and corrosion. It is a nuisance in pipes such as cooling water intakes and outlets, because the effective cross-sectional area is reduced by fouling, with the consequence that flow rates are reduced.

The commercially most successful methods of inhibiting fouling have involved the use of anti-fouling coatings containing substances toxic to aquatic life, for example tributyltin chloride or cuprous oxide. Such coatings, however, are being regarded with increasing disfavour because of the damaging effects such toxins may have if released into the aquatic environment. There is accordingly a need for non-fouling coatings which do not contain markedly toxic materials.

It has been known for many years, for example as disclosed in GB 1,307,001 and U.S. Pat. No. 3,702,778 that silicone rubber coatings resist fouling by aquatic organisms. It is believed that such coatings present a surface to which the organisms cannot easily adhere, and they can accordingly be called non-fouling rather than anti-fouling coatings. Silicone rubbers and silicone compounds generally have very low toxic properties. Silicone rubber coatings have, however, gained little commercial acceptance. It is difficult to make them adhere well to the substrate surface that is to be protected, and mechanically they are rather weak and liable to damage.

It is known to use fluorinated polymers for fouling control in anti-fouling or non-fouling coating compositions.

In JP 04-045170 a fluorinated silicone resin is disclosed which is obtained by grafting a fluorine-containing acrylate to a silicone resin having olefinically unsaturated bonds in its terminal groups.

In JP 61-043668 a coating composition having antifouling properties is disclosed which is prepared by compounding an alkyd resin with a polymer prepared by reacting a fluorine-containing monomer with an acrylate polymer.

In JP 06-322294 a corrosion protecting antifouling coating is disclosed comprising a film forming resin and an organopolysiloxane having oxyalkylene groups and perfluoroalkyl groups.

Fluorinated polymers are also known for other uses.

In JP 06-239876 a fluorinated polymer having excellent wetting properties is disclosed that is used in an adhesive. In U.S. Pat. No. 4,900,474 a perfluoroether group-containing organopolysiloxane is disclosed that is used as a silicone antifoamer.

None of the fluorinated polymers that are known in the art have found wide application in antifouling coating compositions, since their anti-fouling/foul release properties are not sufficient and/or their mechanical properties do not make these compositions suited for use on various kind of structures that are immersed in water. In particular, the mechanical properties should be such that if applied as a coating composition for a boat hull, said coating composition should have sufficient strength and abrasion resistance to have a service life of several years.

SUMMARY OF THE INVENTION

The object of the present invention is to provide a new antifouling coating composition with very good antifouling/foul release properties and sufficient mechanical strength and a process for inhibiting the fouling of a substrate in a marine fouling environment wherein this new antifouling coating composition is used. This process comprises forming on a substrate, before exposure of the substrate to a marine fouling environment, a coating comprising a curable fluorinated resin of the general formula:

$$\text{W-L-YFC—O—R}^f\text{—CFY-L-W} \qquad (I)$$

wherein

L is an organic linking group;

Y is F or $CF_3$;

W is a group of general formula $-Si(R^1)_\alpha(OR^2)_{3-\alpha}$, wherein $\alpha=0$, 1, or 2, preferably $\alpha=0$, $R^1$ and $R^2$ independently have the meaning of linear or branched C1–C6 alkyl groups, optionally containing one or more ether groups, or C7–C12 aryl or alkyl groups, and preferably $R^1$ and $R^2$ are C1–C4 alkyl groups;

$R^f$ is a group having an average molecular weight by number between 350 and 8000, preferably between 500 and 3000, and comprising repeating units having at least one of the following structures randomly distributed along the chain:

—CFXO—, —$CF_2CF_2O$—, —$CF_2CF_2CF_2O$—, —$CF_2CF_2CF_2CF_2O$—, —$CR^4R^5CF_2CF_2O$—, —(CF($CF_3$)$CF_2O$)—, —$CF_2CF(CF_3)O$—, wherein X is F or $CF_3$, $R^4$ and $R^5$ independently have the meaning of H, Cl, or C1–C4 perfluoroalkyl.

DETAILED DESCRIPTION OF THE INVENTION

In the curable fluorinated resin of the general formula:

$$\text{W-L-YFC—O—R}^f\text{—CFY-L-W} \qquad (I)$$

L is preferably a divalent linking group, more preferably L is selected from one or more of the following:

a) —($CH_2$—(O$CH_2CH_2$)$_n$)$_m$—CO—NR'—($CH_2$)$_q$, wherein

R' is H, $C_1$–$C_4$ alkyl or a phenyl group;

m is an integer equal to 0 or 1, preferably 1;

n is an integer in the range 0–8, preferably 0–5;

q is an integer in the range 1–8, preferably 1–3;

b) —CH₂O—CH₂CH₂CH₂— c) —CH₂O—CH₂—CH(OH)CH₂—S—(CH₂)$_q$

L can also be a trivalent group. In this case in formula (I) -L-W becomes -L-(W)₂.

Preference is given to a compound wherein L is a) with m=1, n=0–5, and q=1–3.

Further preference is given to R$^f$ being selected from one of the following structures:

1) —(CF₂O)$_{a'}$—(C₂F₄O)$_{b'}$—, wherein a'/b' is between 0.2 and 2, a' and b' being integers giving the above molecular weight;

2) —(C₃F₆O)$_r$—(C₂F₄O)$_b$—(CFXO)$_t$—, wherein r/b is between 0.5 and 2 and (r+b)/t is between 10 and 30, b, r, and t being integers giving the above molecular weight;

3) —(C₃F₆O)$_{r'}$—(CFXO)$_{t'}$—CF₂(R'f)$_y$—CF₂O—(CFXO)$_{t'}$—(C₃F₆O)$_{r'}$—, wherein t' is larger than 0, r'/t' is between 10 and 30, r' and t' being integers giving the above molecular weight, y is 0 or 1, and R'f is a C1–C4 fluoroalkyl group;

4) —(C₃F₆O)$_z$—CF₂—(R'f)$_y$—CF₂O—(C₃F₆O)$_z$—, wherein z is an integer giving the above molecular weight, y is 0 or 1, and R'f is a C1–C4 fluoroalkyl group;

5) —(OCF₂CF₂CR⁴R⁵)$_q$—OCF₂—(R'f)$_y$—CF₂O—(CR⁴R⁵CF₂O)$_s$—, wherein q and s are integers giving the above molecular weight, R⁴ and R⁵ have the meaning given above, y is 0 or 1, and R'f is a C1–C4 fluoroalkyl group.

In the above structures —(C₃F₆O)— can be —(CF(CF₃)CF₂O)— or —(CF₂CF(CF₃)O)—. The product of formula (I) can be prepared by the method disclosed in U.S. Pat. No. 4,746,550.

Good results in foul release and/or mechanical strength were found for a coating composition comprising the fluorinated resin of formula (I) that is obtainable by reacting a silicon compound, as defined below, with bifunctional perfluoropolyethers having —OH or —COOR end groups, with R=H or C1–C3 of the general formula:

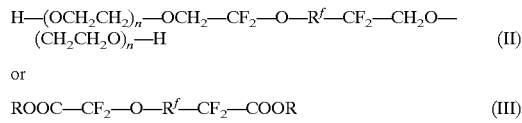

H—(OCH₂CH₂)$_n$—OCH₂—CF₂—O—R$^f$—CF₂—CH₂O—(CH₂CH₂O)$_n$—H    (II)

or

ROOC—CF₂—O—R$^f$—CF₂—COOR    (III)

wherein R$^f$ and n have the meaning as defined before. These compounds are commercially available from Ausimont under the names Fomblin® ZDOL, ZDEAL, ZDOL-TX. However, it is also possible to use bifunctional perfluoroethers having other end groups, e.g., epoxy groups Examples of suitable silicon compounds which can be reacted with the above bifunctional perfluoropolyether precursors are compounds of the general formula

R³—Si—(R⁴)₃    (IV)

wherein R³ is a group capable of coupling the silicon compound to the fluorinated polyether and the R⁴ groups each independently have the meaning of an ether group, ester group, or preferably a group including a straight-chain or branched alkyl moiety having from 1 to 4 carbon atoms.

For example, a silicon compound in which R³ is an isocyanate-functional group can be coupled to a fluorinated polyether having at least two functional groups selected from hydroxyl, amine, or carboxylic acid-functional groups. A silicon compound in which R³ is an amine-functional group can be coupled to a fluorinated polyether having at least two functional groups selected from carboxylic acid ester or epoxy-functional groups. A silicon compound in which R³ is a thiol-functional group can be coupled to a fluorinated polyether having at least two epoxy-functional groups.

Examples of preferred silicon compounds are alkoxyalkylsilyl isocyanates, alkoxysilyl alkyl isocyanates, alkoxy silanes, alkoxyalkyl silanes, and alkoxyalkylsilyl mercapto-, amino-, and glycidyl-functional compounds, such as 3-methyldimethoxy silylpropyl isocyanate,
3-trimethoxy silylpropyl isocyanate,
3-triethoxy silylpropyl isocyanate,
3-mercaptopropyl trimethoxy silane,
3-mercaptopropyl methyldimethoxy silane,
3-aminopropyl trimethoxy silane,
3-aminopropyl triethoxy silane, and
3-glycidoxypropyl trimethoxy silane.

The thus obtained fluorinated resins are also the subject of the present invention.

In general, good results in both anti/non-fouling properties and mechanical strength are found when the fluorinated resin has a T$_g$ in the range from –120 to 20° C. and a surface energy in the range from 10 to 25 mN/m. In general, mechanical properties improve when the T$_g$ of the resin is increased, foul release properties improve when the T$_g$ of the material is lowered. So, for each fluorinated resin an optimum balance has to be found between mechanical properties and foul release properties by tuning the T$_g$ of the resin. This tuning can, e.g., be done by varying the length of the R$^f$ segment or the W segment A coating composition can be prepared by mixing the fluorinated resin, a curing catalyst, for example a condensation catalyst, optionally a co-catalyst, optionally a crosslinker for the resin, a reactive or non-reactive fluid additive, solvents, fillers, pigments and/or thixotropes.

Examples of catalysts that may be used include the carboxylic acid salts of various metals, such as tin, zinc, iron, lead, barium, and zirconium. The salts preferably are salts of long-chain carboxylic acids, for example dibutyltin dilaurate, dibutyltin dioctoate, iron stearate, tin (II) octoate, and lead octoate. Further examples of suitable catalysts include organobismuth and organotitanium compounds and organo-phosphates such as 2-ethyl-hexyl hydrogen phosphate. Other possible catalysts include chelates, for example dibutyltin acetoacetonate. Further, the catalyst may comprise a halogenated organic acid, which has at least one halogen substituent on a carbon atom which is in α-position relative to the acid group and/or at least one halogen substituent on a carbon atom which is in β-position relative to the acid group, or a derivative which is hydrolysable to form such an acid under the conditions of the condensation reaction.

The presence of a cross-linker for the resin is only necessary if the resin cannot be cured by condensation. This depends on the functional groups that are present in the fluorinated resin. In general, when the fluorinated resin comprises alkoxy groups, the presence of a cross-linker is not necessary. If the fluorinated resin comprises alkoxy-silyl groups, in general the presence of a small amount of a condensation catalyst and water is sufficient to achieve full cure of the coating after application. For these compositions, normally atmospheric moisture is sufficient to induce curing and as a rule it will not be necessary to heat the coating composition after application.

The crosslinker that is optionally present can be a cross-linking agent comprising a functional silane and/or one or more oxime groups. Examples of such cross-linking agents are presented in WO99/33927. Mixtures of different cross-linkers can also be used Examples of reactive or non-reactive fluid additives that can be used in the coating composition according to the present invention are non- or monofunctional fluorinated polyethers. These compounds can be represented by the following structure:

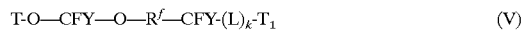

T-O—CFY—O—R$^f$—CFY-(L)$_k$-T₁    (V)

wherein k is an integer 0 or 1,

T is selected from —CF$_3$, —C$_2$F$_5$, —C$_3$F$_7$, CF$_2$Cl, C$_2$F$_4$Cl, C$_3$F$_6$Cl, T$_1$=—O-T when k=0, T$_1$=W when k is 1.

and wherein R$^f$, Y, and L have the meaning as defined before.

Commercial products are available from Ausimont, e.g. Fomblin® Y25. Other unreactive oils such as silicone oil, especially methyl-phenyl silicone oil, petrolatum, polyolefin oil, or a polyaromatic oil can also be used. The proportion of these reactive or non-reactive fluid additives may be in the range of from 0 to 25% by weight, based on the total weight of the coating composition.

Examples of solvents that can be used in the coating composition according to the present invention include polar solvents or mixtures thereof, such as methyl isobutyl ketone or butyl acetate. Non-polar solvents or mixtures thereof, for example xylene, can be used as co-solvents Examples of fillers that can be used in the coating composition according to the present invention are barium sulphate, calcium sulphate, calcium carbonate, silicas or silicates (such as talc, feldspar, and china clay), aluminium paste/flakes, bentonite or other clays. Some fillers may have a thixotropic effect on the coating composition. The proportion of fillers may be in the range of from 0 to 25% by weight, based on the total weight of the coating composition.

Examples of pigments that can be used in the coating composition according to the present invention are black iron oxide and titanium dioxide. The proportion of pigments may be in the range of from 0 to 10% by weight, based on the total weight of the coating composition.

The coating composition can be applied by normal techniques, such as brush, roller or spray (airless and conventional). To achieve proper adhesion to the substrate it is preferred to apply the anti/non-fouling coating composition to a primed substrate. The primer can be any conventional primer/sealer coating system. Good results were found, in particular with respect to adhesion, when using a primer that comprises an acrylic siloxy-functional polymer, a solvent, a thixotropic agent, filler, and, optionally, a moisture scavenger. Such a primer is disclosed in WO 99/33927.

It is also possible to apply the coating composition in the process according to the present invention on a substrate containing an aged anti-fouling coating layer. Before the coating composition is applied to such an aged layer, this old layer is cleaned by high-pressure water washing to remove any fouling. The primer disclosed in WO 99/33927 can be used as a tie coat between the aged coating layer and the coating composition according to the present invention. In general, low-surface energy coatings such as coatings comprising silicones or fluoropolymers do not provide a sound base for application of the coating composition according to the present invention, not even after the application of a tie-coat, since the adhesion between the aged coating layer and the freshly applied coating layer in general is insufficient.

After the coating has been cured, it can be immersed immediately and gives immediate anti-fouling and fouling release protection.

As indicated above, the coating composition used in the process according to the present invention has very good anti-fouling and foul release properties in combination with a high mechanical strength. This makes these coating compositions very suitable for use as anti-fouling or non-fouling coatings for marine applications. The coating can be used for both dynamic and static structures, such as boat hulls, buoys, drilling platforms, oil production rigs, and pipes which are immersed in water. The coating can be applied on any substrate that is used for these structures, such as metal, concrete, wood or fibre-reinforced resin.

The coating compositions used in the process according to the present invention are preferably applied as high solids formulations. These compositions comprise less than 30% by weight of solvent, preferably less than 20%, still more preferably less than 10%. These formulations belong to the class of solventless coatings. Such coatings have minimal environmental impact in view of their low solvent content.

The combination of low (ambient) temperature curing of the resins and high solids content of the coating composition makes the coating compositions according to the present invention suitable for application in the open field.

The invention will be elucidated with reference to the following examples. These are intended to illustrate the invention, but are not to be construed as limiting in any manner the scope thereof.

EXAMPLES

Example 1

Preparation of an Adduct of a Perfluoroether 200 pbw of a bifunctional perfluoropolyether of formula (II) having n=0 and a number average molecular weight of 1000 were added to a flange-topped reaction vessel with a mechanical stirrer, a temperature probe, a water condenser, and a feed inlet. After the addition of 0.02 pbw of dibutyltin dilaurate (DBTDL), the reaction vessel was heated to 70° C. At this temperature, 88 pb of 3-(trimethoxysilylpropyl) isocyanate (TMSPI) were added dropwise over a two-hour period. During the addition the temperature was maintained at 70° C. using a temperature control unit. After the completion of the feed, the solution was stirred for another hour to complete the reaction. The progress of the reaction could be monitored by measuring the decrease of the infrared absorption of TMSPI at ~2270 cm$^{-1}$.

The adduct has a viscosity at 25° C. of 4.1 Poise (0.41 Pa.s) and a T$_g$ of −26° C.

Example 2

Preparation of an Adduct of an Ethoxylated Perfluoroether

Using the same process as described in Example 1, a bifunctional perfluoropolyether of formula (II) having n=1,5 and a number average molecular weight of 2000 was used as a perfluoroether starting component in the reaction.

The formed adduct has a viscosity at 25° C. of 8.1 Poise (0.81 Pa.s) and a T$_g$ of −97°.

Example 3

Using the process of Example 1, a perfluorinated adduct was obtained by a reaction between a bifunctional diester of formula (III) wherein R=CH$_3$ having a number average molecular weight of 2000 and an equimolar amount of 3-aminopropyl trimethoxysilane at 70° C. During the reaction methanol was removed by distillation until the ester IR-band at about 1800 cm$^{-1}$ had disappeared completely.

Example 4

A one-pack coating composition was prepared by combining 100 g of the adduct of a perfluoroether of Example 1

10 g of butyl acetate 0.2 g of 3-aminopropyl trimethoxy silane 0.1 g of dibutyltin dilaurat After application of this coating composition on a wooden substrate and curing of the composition, a coating was obtained with a modulus at 20° C. of 42.5 Mpa (measured in accordance with ASTM D1708) and a pencil hardness of 3H (measured in accordance with ASTM D3363)

Example 5

A one-pack coating composition was prepared by combining 100 g of the adduct of a perfluoroether of Example 1
20 g of butyl acetate
0.2 g of 3-aminopropyl trimethoxy silane
0.1 g of dibutyltin dilaurate
3 g of Fomblin Y-25 (a perfluorinated polyether, ex Ausimont)

Example 6

A two-pack coating composition was prepared by having
100 g of the adduct of a perfluoroether of Example 2 in one pack and combining
10 g of butyl acetate
0.2 g of 3-aminopropyl trimethoxy silane
0.1 g of dibutyltin dilaurate
in the other pack.

After application of this coating composition on a wooden substrate and curing of the composition, a coating was obtained with a modulus at 20° C. of 3.1 Mpa (measured in accordance with ASTM D1708) and a pencil hardness of 4B (measured in accordance with ASTM D3363

Example 7

A one-pack coating composition was prepared by combining 100 g of the adduct of a perfluoroether of Example 1
10 g of butyl acetate
0.2 g of 3-aminopropyl trimethoxy silane
0.1 g of dibutyltin dilaurate
30 g of talc
6 g of black iron oxide
25 g of aluminium flake

Example 8

A one-pack coating composition was prepared by combining 100 g of the adduct of a perfluoroether of Example 2
20 g of butyl acetate
1 g of 2-ethylhexylhydrogen phosphate
3 g of Fomblin Y-25 (a perfluorinated polyether, ex Ausimont)

The coating compositions of Examples 4–8 were applied to wood substrates bearing an anti-corrosive undercoat and coating primers as disclosed in WO 99/33927. The coating formulations were applied by brush and roller to give a layer of average dry film thickness in the range from 25 to 75 μm.

For static anti-fouling assessment the coated substrates were immersed in a marine estuary known for its weed, slime, hard-shelled and soft-bodied animal fouling. After one season (February–October) the accumulated fouling was significantly less than that of control substrates not coated with the compositions and maintained under the same conditions over the same period of time. Any fouling on the substrates with the compositions of Examples 4–8 could be removed easily by light rubbing or low-pressure water jet. Accumulated fouling on the control substrates immersed over the same period could not be removed in a similar way.

For these coating compositions the following quantitative fouling properties were found:

| Example | % micro fouling | % soft-bodied animal | % hard-bodied animal | % total fouling | Push-off (PSI)* |
|---|---|---|---|---|---|
| 4 | 25 | 1.7 | 56.7 | 83.4 | 20.55 |
| 5 | 23.8 | 3.5 | 41.3 | 68.6 | 11.04 |
| 6 | 28.8 | 2.2 | 50 | 81 | 13.34 |
| 7 | 19.7 | 2.2 | 6.8 | 28.7 | 6.24 |
| 8 | 51.4 | 4.2 | 22.4 | 78 | 9.11 |

*Measured in accordance with ASTM standard D-5618, barnacle type Semibalanus Balanoides

Example 9

A coating composition was prepared by combining
100 g of the adduct of a perfluoroether of Example 3
20 g of butyl acetate
1 g of 2-ethylhexylhydrogen phosphate
3 g of Fomblin Y-04 (a perfluorinated polyether, ex Ausimont)

Example 10

A coating composition was prepared by combining
100 g of the adduct of a perfluoroether of Example 2
20 g of butyl acetate
15 g of titaniumdioxide
1 g of 2-ethylhexylhydrogen phosphate
6 g of Fomblin Y-25 (a perfluorinated polyether, ex Ausimont)

The coating compositions of Examples 9 and 10 were applied to wood substrates bearing an anti-corrosive undercoat and coating primers as disclosed in WO 99/33927. The coating formulations were applied by brush and roller to give a layer of average dry film thickness in the range from 25 to 75 μm.

For static anti-fouling assessment the coated substrates were immersed in a marine estuary known for its weed, slime, hard-shelled and soft-bodied animal fouling.

What is claimed is:

1. A process for inhibiting the fouling of a substrate in a marine fouling environment, which comprises forming on the substrate, before exposure to the said environment, a coating comprising a curable fluorinated resin of the general formula:

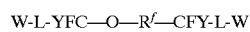

W-L-YFC—O—R$^f$—CFY-L-W wherein

L is one or more of the following organic linking groups:
a) —(CH$_2$—(OCH$_2$CH$_2$)$_n$)$_m$—CO—NR'—(CH$_2$)$_q$,
b) —CH$_2$O—CH$_2$CH$_2$CH$_2$—
c) —CH$_2$O—CH$_2$—CH(OH)CH$_2$—S—(CH$_2$)$_q$ wherein
R' is H, C$_1$–C$_4$ alkyl or a phenyl group;
m is an integer equal to 1;
n is an integer in the range 0–8;
q is an integer in the range 1–8;

Y is F or CF$_3$;

W is a group of general formula —Si(R$^1$)$_\alpha$(OR$^2$)$_{3-\alpha}$, wherein α=0, 1, or 2, R$^1$ and R$^2$ independently have the meaning of linear or branched C1–C6 alkyl groups, optionally containing one or more ether groups, or C7–C12 aryl or alkyl groups;

R$^f$ is a group having an average molecular weight by number between 350 and 8000, comprising repeating units having at least one of the following structures randomly distributed along the chain:
—CFXO—, —CF$_2$CF$_2$O—, —CF$_2$CF$_2$CF$_2$O—, —CF$_2$CF$_2$CF$_2$CF$_2$O—, —CR$^4$R$^5$CF$_2$CF$_2$O—, —(CF(CF$_3$)CF$_2$O)—, —CF$_2$CF(CF$_3$)O—,
wherein
X is F or CF$_3$,
R$^4$ and R$^5$ independently have the meaning of H, Cl, or C1–C4 perfluoroalkyl.

2. The process according to claim 1, wherein the organic linking group L is group a) and n is an integer in the range 0–5 and q is an integer in the range 1–3.

3. The process according to claim 1, wherein R$^f$ is one or more of the following groups:
1) —(CF$_2$O)$_{a'}$—(C$_2$F$_4$O)$_{b'}$—, wherein a'/b' is between 0.2 and 2, a' and b' being integers giving a number average molecular weight in the range from 350 to 8000;
2) —(C$_3$F$_6$O)$_r$—(C$_2$F$_4$O)$_b$—(CFXO)$_t$—, wherein r/b is between 0.5 and 2 and (r+b)/t is between 10 and 30, b, r, and t being integers giving a number average molecular weight in the range from 350 to 8000;
3) —(C$_3$F$_6$O)$_{r'}$—(CFXO)$_{t'}$—CF$_2$(R'f)$_y$—CF$_2$O—(CFXO)$_{t'}$—(C$_3$F$_6$O)$_{r'}$—, wherein t' is larger than 0, r'/t' is between 10 and 30, r' and t' being integers giving a number average molecular weight in the range from 350 to 8000, y is 0 or 1, and R'f is a C1–C4 fluoroalkyl group;
4) —(C$_3$F$_6$O)$_z$—CF$_2$—(R'f)$_y$—CF$_2$O—(C$_3$F$_6$O)$_z$—, wherein z is an integer giving a number average molecular weight in the range from 350 to 8000, y is 0 or 1, and R'f is a C1–C4 fluoroalkyl group;
5) —(OCF$_2$CF$_2$CR$^4$R$^6$)$_q$—OCF$_2$—(R'f)$_y$—CF$_2$O—(CR$^4$R$^5$CF$_2$CF$_2$O)$_s$—, wherein q and s are integers giving a number average molecular weight in the range from 350 to 8000, R$^4$ and R$^5$ independently have the meaning of H, Cl, or C1–C4 perfluoroalkyl, y is 0 or 1, and R'f is a C1–C4 fluoroalkyl group;
whereby in the above structures —(C$_3$F$_6$O)— can be —(CF(CF$_3$)CF$_2$O)— or —(CF$_2$CF(CF$_2$)O)—.

4. The process according to claim 1, wherein the fluorinated resin has a T$_g$ in the range from –120 to 20° C. and a surface energy in the range from 10 to 25 mN/m.

5. The process according to claim 1, wherein the coating composition further comprises a non-functional or mono-functional resin of the general formula:

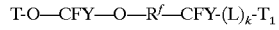

wherein
k is an integer 0 or 1;
T is —CF$_3$, —C$_2$F$_5$, —C$_3$F$_7$, CF$_2$Cl, C$_2$F$_4$Cl, or C$_3$F$_6$Cl;
T$_1$=—O-T when k=0, T$_1$=W when k is 1;
L is an organic linking group;
Y is F or CF$_3$; and
R$^f$ is a group having an average molecular weight by number between 350 and 8000, comprising repeating units having at least one of the following structures randomly distributed along the chain:
—CFXO—, —CF$_2$CF$_2$O—, —CF$_2$CF$_2$CF$_2$O—, —CF$_2$CF$_2$CF$_2$CF$_2$O—, —CR$^4$R$^5$CF$_2$CF$_2$O—, —(CF(CF$_3$)CF$_2$O)—, —CF$_2$CF(CF$_3$)O—,
wherein
X is F or CF$_3$;
R$^4$ and R$^5$ independently have the meaning of H, Cl, or C1–C4 perfluoroalkyl.

6. An antifouling or non-fouling marine costing composition comprising a curable fluorinated resin of the general formula:

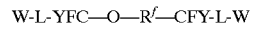

wherein
L is one or more of the following organic linking groups:
a) —(CH$_2$—(OCH$_2$CH$_2$)$_n$)$_m$—CO—NR'—(CH$_2$)$_q$,
b) —CH$_2$O—CH$_2$CH$_2$CH$_2$—
c) —CH$_2$O—CH$_2$—CH(OH)CH$_2$—S—(CH$_2$)$_q$
wherein
R$^f$ is H, C$_1$–C$_4$ alkyl or a phenyl group;
m is an integer equal to 1;
n is an integer in the range 0–8;
q is an integer in the range 1–8;
Y is F or CF$_3$;
W is a group of general formula —Si(R$^1$)$_\alpha$(OR$^2$)$_{3-\alpha}$, wherein α=0, 1, or 2, R$^1$ and R$^2$ independently have the meaning of linear or branched C1–C6 alkyl groups, optionally containing one or more ether groups, or C7–C12 aryl or alkyl groups;
R$^f$ is a group having an average molecular weight by number between 350 and 8000, comprising repeating units having at least one of the following structures randomly distributed along the chain:
—CFXO—, —CF$_2$CF$_2$O—, —CF$_2$CF$_2$CF$_2$O—, —CF$_2$CF$_2$CF$_2$CF$_2$O—, —CR$^4$R$^5$CF$_2$CF$_2$O—, —(CF(CF$_3$)CF$_2$O)—, —CF$_2$CF(CF$_3$)O—,
wherein
X is F or CF$_3$,
R$^4$ and R$^5$ independently have the meaning of H, Cl, or C1–C4 perfluoroalkyl.

7. The coating composition according to claim 6, wherein the fluorinated resin has a T$_g$ in the range from –120 to 20° C. and a surface energy in the range from 10 to 25 mN/m.

8. The coating composition according to claim 6, wherein the organic linking group L is group a) and n is an integer in the range 0–5 and q is an integer in the range 1–3.

9. The coating composition according to claim 6, wherein R$^f$ is one or more of the following groups:
1) —(CF$_2$O)$_{a'}$—(C$_2$F$_4$O)$_{b'}$—, wherein a'/b' is between 0.2 and 2, a' and b' being integers giving a number average molecular weight in the range from 350 to 8000;
2) —(C$_3$F$_6$O)$_r$—(C$_2$F$_4$O)$_b$—(CFXO)$_t$—, wherein r/b is between 0.5 and 2 and (r+b)/t is between 10 and 30, b, r, and t being integers giving a number average molecular weight in the range from 350 to 8000;
3) —(C$_3$F$_6$O)$_{r'}$—(CFXO)$_{t'}$—CF$_2$(R'f)$_y$—CF$_2$O—(CFXO)$_{t'}$—(C$_3$F$_6$O)$_{r'}$—, wherein t' is larger than 0, r'/t' is between 10 and 30, r' and t' being integers giving a number average molecular weight in the range from 350 to 8000, y is 0 or 1, and R'f is a C1–C4 fluoroalkyl group;
4) —(C$_3$F$_5$O)$_z$—CF$_2$—(R'f)$_y$—CF$_2$O—(C$_3$F$_6$O)$_z$—, wherein z is an integer giving a number average molecular weight in the range from 350 to 8000, y is 0 or 1, and R'f is a C1–C4 fluoroalkyl group;
5) —(OCF$_2$CF$_2$CR$^4$R$^5$)$_q$—OCF$_2$—(R'f)$_y$—CF$_2$O—(CR$^4$R$^5$CF$_2$CF$_2$O)$_s$—, wherein q and s are integers giving a number average molecular weight in the range from 350 to 8000, R$^4$ and R$^5$ independently have the meaning of H, Cl, or C1–C4 perfluoroalkyl, y is 0 or 1, and R'f is a C1–C4 fluoroalkyl group;
whereby in the above structures —(C$_3$F$_6$O)— can be —(CF(CF$_3$)CF$_2$O)— or —(CF$_2$CF(CF$_3$)O)—.

10. A process for inhibiting the fouling of a substrate in a marine fouling environment, which comprises forming on the substrate, before exposure to the said environment, a coating comprising a curable fluorinated resin made from a compound of the general formula:

W-L-YFC—O—$R^f$—CFY-L-W wherein
L is one or more of the following organic linking groups:
a) —(CH$_2$(OCH$_2$CH$_2$)$_{nm}$—CO—NR$^{f}$—(CH$_2$)$_q$,
b) —CH$_2$O—CH$_2$CH$_2$CH$_2$—
c) —CH$_2$O—CH$_2$—CH(OH)CH$_2$—S—(CH$_2$)$_q$
wherein
R$^f$ is H, C$_1$–C$_4$ alkyl or a phenyl group;
m is an integer equal to 1;
n is an integer in the range 0–8;
q is an integer in the range 1–8;
Y is F or CF$_3$;
W is a group of general formula —Si(R$^1$)$_\alpha$(OR$^2$)$_{3-\alpha}$, wherein α=0, 1, or 2, R$^1$ and R$^2$ independently have the meaning of linear or branched C1–C6 alkyl groups, optionally containing one or more ether groups, or C7–C12 aryl or alkyl groups;
R$^f$ is a group having an average molecular weight by number between 350 and 8000, comprising repeating unite having at least one of the following structures randomly distributed along the chain;
—CFXO—, —CF$_2$CF$_2$O—, —CF$_2$CF$_2$CF$_2$O—, —CF$_2$CF$_2$CF$_2$CF$_2$O—, —CR$^4$R$^6$CF$_2$CF$_2$O—, —(CF(CF$_2$)CF$_2$O)—, —CF$_2$CF(CF$_3$)O—,
wherein
X is F or CF$_3$,
R$^4$ and R$^5$ independently have the meaning of H, Cl, or C1–C4 perfluoroalkyl.

11. The process according to claim 10, wherein the organic linking group L is group a) and n is an integer in the range 0–5 and q is an integer in the range 1–3.

12. The process according to claim 10, wherein R$^f$ is one or more of the following groups:
1) —(CF$_2$O)$_{a'}$—(C$_2$F$_4$O)$_{b'}$—, wherein a'/b' is between 0.2 and 2, a' and b' being integers giving a number average molecular weight in the range from 350 to 8000;
2) —(C$_3$F$_6$O)$_r$—(C$_2$F$_4$O)$_b$—(CFXO)$_t$—, wherein r/b is between 0.5 and 2 and (r+b)/t is between 10 and 30, b, r, and t being integers giving a number average molecular weight in the range from 350 to 8000;
3) —(C$_3$F$_6$O)$_{r'}$—(CFXO)$_{t'}$—CF$_2$(R'f)$_y$—CF$_2$O—(CFXO)$_{t'}$—(C$_3$F$_6$O)$_{r'}$—, wherein t' is larger than 0, r'/t' is between 10 and 30, r' and t' being integers giving a number average molecular weight in the range from 350 to 8000, y is 0 or 1, and R'f is a C1–C4 fluoroalkyl group;
4) —(C$_3$F$_6$O)$_z$—CF$_2$—(R'f)$_y$—CF$_2$O—(C$_3$F$_6$O)$_z$—, wherein z is in integer giving a number average molecular weight in the range from 350 to 8000, y is 0 or 1, and R'f is a C1–C4 fluoroalkyl group;
5) —(OCF$_2$CF$_2$CR$^4$R$^5$)$_q$—OCF$_2$—(R'f)$_y$—CF$_2$O—(CR$^4$R$^5$CF$_2$CF$_2$O)$_s$—, wherein q end s are integers giving a number average molecular weight in the range from 350 to 8000, R$^4$ and R$^5$ independently have the meaning of H, Cl, or C1–C4 perfluoroalkyl, y is 0 or 1, and R'f is a C1–C4 fluoroalkyl group;
whereby in the above structures —(C$_3$F$_6$O)— can be —(CF(CF$_3$)CF$_2$O)— or —(CF$_2$CF(CF$_3$)O)—.

13. The process according to claim 10, wherein the fluorinated resin has a T$_g$ in the range from −120 to 20° C. and a surface energy in the range from 10 to 25 mN/m.

14. A coated marine vessel or structure wherein the coating is formed from a composition comprising a curable fluorinated resin resulting from the general formula:

W-L-YFC—O—$R^f$—CFY-L-W wherein
L is an organic linking group;
Y is F or CF$_3$;
W is a group of general formula —Si(R$^f$)$_\alpha$(OR$^2$)$_{3-\alpha}$, wherein α=0, 1, or 2, R$^1$ and R$^2$ independently have the meaning of linear or branched C1–C6 alkyl groups, optionally containing one or more ether groups, or C7–C12 aryl or alkyl groups;
R$^f$ is a group having an average molecular weight by number between 350 and 8000, comprising repeating units having at least one of the following structures randomly distributed along the chain:
—CFXO—, —CF$_2$CF$_2$O—, —CF$_2$CF$_2$CF$_2$O—, —CF$_2$CF$_2$CF$_3$CF$_2$O—, —CR$^4$R$^5$CF$_2$CF$_2$O—, —(CF(CF$_3$)CF$_2$O)—, —CF$_2$CF(CF$_3$)O—,
wherein
X is F or CF$_3$,
R$^4$ and R$^5$ independently have the meaning of H, Cl, or C1–C4 perfluoroalkyl.

15. The marine vessel or structure according to claim 14, wherein the organic linking group L is one or more of the following groups:
a) —(CH$_2$—(OCH$_2$CH$_2$)$_n$)$_m$—CO—NR$^{f}$—(CH$_2$)$_q$,
b) —CH$_2$O—CH$_2$CH$_2$CH$_2$—
c) —CH$_2$O—CH$_2$—CH(OH)CH$_2$—S—(CH$_2$)$_q$
wherein
R$^{f}$ is H, C$_1$–C$_4$ alkyl or a phenyl group;
m is an integer equal to 0 or 1;
n is an integer in the range 0–8;
q is an integer in the range 1–8.

16. The marine vessel or structure according to claim 15, wherein the organic linking group L is group a) and m is 1, n is an integer in the range 0–5 and q is an integer in the range 1–3.

17. The marine vessel or structure according to claim 14, wherein R$^f$ is one or more of the following groups:
1) —(CF$_2$O)$_{a'}$—(C$_2$F$_4$O)$_{b'}$—, wherein a'/b' is between 0.2 and 2, a' and b' being integers giving a number average molecular weight in the range from 350 to 8000;
2) —(C$_3$F$_6$O)$_r$—(C$_2$F$_4$O)$_b$—(CFXO)$_t$—, wherein r/b is between 0.5 and 2 and (r+b)/t is between 10 and 30, b, r, and t being integers giving a number average molecular weight in the range from 350 to 8000;
3) —(C$_3$F$_5$O)$_{r'}$—(CFXO)$_{t'}$—CF$_2$(R'f)$_y$—CF$_2$O—(CFXO)$_{t'}$—(C$_3$F$_6$O)$_{r'}$—, wherein t' is larger thin 0, r'/t' is between 10 and 30, r' and t' being integers giving a number average molecular weight in the range from 350 to 8000, y is 0 or 1, and R'f is a C1–C4 fluoroalkyl group;

4) —(C$_3$F$_6$O)$_z$—CF$_2$—(R'f)$_y$—CF$_2$O—(C$_3$F$_6$O)$_z$—, wherein z is an integer giving a number average molecular weight in the range from 350 to 8000, y is 0 or 1, and R'f is a C1–C4 fluoroalkyl group;

5) —(OCF$_2$CF$_2$CR$^4$R$^5$)$_q$—OCF$_2$—(R'f)$_y$—CF$_2$O—, (CR$^4$R$^5$CF$_2$CF$_2$O)$_s$—, wherein q and s are integers giving a number average molecular weight in the range from 350 to 8000, R$^4$ and R$^5$ independently have the meaning of H, Cl, or C1–C4 perfluoroalkyl, y is 0 or 1, and R'f is a C1–C4 fluoroalkyl group;

whereby in the above structures —(C$_3$F$_6$O)— can be —(CF(CF$_3$)CF$_2$O)— or —(CF$_2$CF(CF$_3$)O)—.

18. The marine vessel or structure according to claim 14, wherein the fluorinated resin has a T$_g$ in the range from –120 to 20° C. and a surface energy in the range from 10 to 25 mN/m.

* * * * *

UNITED STATES PATENT AND TRADEMARK OFFICE
CERTIFICATE OF CORRECTION

PATENT NO.     : 6,899,955 B2
DATED          : May 31, 2005
INVENTOR(S)    : Lines et al.

It is certified that error appears in the above-identified patent and that said Letters Patent is hereby corrected as shown below:

Column 9,
Line 15, "1)—$(CF_2O)_a$—$(C_2F_4O)_b$—," should read -- —$(CF_2O)_{a'}$—$(C_2F_4O)_{b'}$—, --.
Line 19, "between 0.5 and 2 (r+b)/t" should read -- between 0.5 and 2 and (r+b)/t --.
Line 32, "5) —$(OCF_2CF_2CR^4R^6)_q$-$OCF_2$- $(R'f)_y$-$CF_2O$—" should read
-- 5) —$(OCF_2CF_2CR^4R^5)_q$-$OCF_2$- $(R'f)_y$-$CF_2O$— --.
Line 37, "and R't is a C1-C4" should read -- and R'f is a C1-C4 --.
Line 39, "or —$(CF_2CF(CF_2)O)$ —." should read -- or —$(CF_2CF(CF_3)O)$ —. --.

Column 10,
Line 1, "marine costing compo-" should read -- marine coating compo- --.
Line 13, "$R^f$ is H, $C_1$-$C_4$ alkyl" should read -- R' is H, $C_1$-$C_4$ alkyl --.

Column 11,
Line 11, "a) —$(CH_2(OCH_2CH_2)_{nm}$—CO—$NR^{'f}$—$(CH_2)_q$," should read
-- a) —$(CH_2$-$(OCH_2CH_2)_n)_m$—CO–NR'–$(CH_2)_q$, --.
Line 15, "$R^f$ is H, $C_1$-$C_4$ alkyl" should read -- R' is H, $C_1$-$C_4$ alkyl --.
Line 27, "unite having at least one" should read -- units having at least one --.
Line 30, "—$CR^4R^6CF_2CF_2O$—, —(CF" should read -- —$CR^4R^5CF_2CF_2O$—, —(CF --.
Line 31, "$(CF_2)CF_2O)$—," should read -- $(CF_3)CF_2O)$—, --.
Line 59, "wherein q end s" should read -- wherein q and s --.

UNITED STATES PATENT AND TRADEMARK OFFICE
CERTIFICATE OF CORRECTION

PATENT NO. : 6,899,955 B2
DATED : May 31, 2005
INVENTOR(S) : Lines et al.

It is certified that error appears in the above-identified patent and that said Letters Patent is hereby corrected as shown below:

Column 12,
Line 14, "—Si($R^f$)$_\alpha$(OR$^2$)$_{3-\alpha}$," should read -- —Si($R^1$)$_\alpha$(OR$^2$)$_{3-\alpha}$, --.
Line 33, "—CO—NR$^f$—(CH$_2$)$_q$," should read -- —CO—NR'—(CH$_2$)$_q$, --.
Line 37, "R$^{'f}$ is H, C$_1$-C$_4$ alkyl" should read -- R' is H, C$_1$-C$_4$ alkyl --.
Line 47, "1) —(CF$_2$O)$_{a'}$-(C$_2$F$_4$O)$_{b-}$," should read -- 1) —(CF$_2$O)$_{a'}$— (C$_2$F$_4$O)$_{b'}$—,--.
Line 62, "—(C$_3$F$_5$O)$_r$—(CFXO)$_t$—CF$_2$(R'f)$_y$—CF$_2$O— (CFXO)$_{t'}$" should read -- — (C$_3$F$_6$O)$_r$—(CFXO)$_t$—CF$_2$(R'f)$_y$—CF$_2$O— (CFXO)$_{t'}$ --.
Line 63, "t' is larger thin 0," should read -- t' is larger than 0, --.

Signed and Sealed this

Twenty-seventh Day of September, 2005

JON W. DUDAS
*Director of the United States Patent and Trademark Office*

UNITED STATES PATENT AND TRADEMARK OFFICE
CERTIFICATE OF CORRECTION

PATENT NO. : 6,899,955 B2
DATED : May 31, 2005
INVENTOR(S) : Lines et al.

It is certified that error appears in the above-identified patent and that said Letters Patent is hereby corrected as shown below:

Column 9,
Line 15, "1)—$(CF_2O)_a$—$(C_2F_4O)_b$—," should read -- —$(CF_2O)_{a'}$—$(C_2F_4O)_{b'}$—, --.
Line 19, "between 0.5 and 2 (r+b)/t" should read -- between 0.5 and 2 and (r+b)/t --.
Line 32, "5) —$(OCF_2CF_2CR^4R^6)_q$-$OCF_2$- $(R'f)_y$-$CF_2O$—" should read
-- 5) —$(OCF_2CF_2CR^4R^5)_q$-$OCF_2$- $(R'f)_y$-$CF_2O$— --.
Line 37, "and R't is a C1-C4" should read -- and R'f is a C1-C4 --.
Line 39, "or —$(CF_2CF(CF_2)O)$ —." should read -- or —$(CF_2CF(CF_3)O)$ —. --.

Column 10,
Line 1, "marine costing compo-" should read -- marine coating compo- --.
Line 13, "$R^f$ is H, $C_1$-$C_4$ alkyl" should read -- R' is H, $C_1$-$C_4$ alkyl --.

Column 11,
Line 11, "a) —$(CH_2(OCH_2CH_2)_{nm}$—CO—$NR^{'f}$—$(CH_2)_q$," should read
-- a) —$(CH_2(OCH_2CH_2)_n)_m$—CO–NR'–$(CH_2)_q$, --.
Line 15, "$R^f$ is H, $C_1$-$C_4$ alkyl" should read -- R' is H, $C_1$-$C_4$ alkyl --.
Line 27, "unite having at least one" should read -- units having at least one --.
Line 30, "—$CR^4R^6CF_2CF_2O$—, —(CF" should read -- —$CR^4R^5CF_2CF_2O$—, —(CF --.
Line 31, "$(CF_2)CF_2O$)—," should read -- $(CF_3)CF_2O$)—, --.
Line 59, "wherein q end s" should read -- wherein q and s --.

UNITED STATES PATENT AND TRADEMARK OFFICE
CERTIFICATE OF CORRECTION

PATENT NO. : 6,899,955 B2
DATED : May 31, 2005
INVENTOR(S) : Lines et al.

It is certified that error appears in the above-identified patent and that said Letters Patent is hereby corrected as shown below:

Column 12,
Line 14, "—Si($R^f$)$_\alpha$(OR$^2$)$_{3-\alpha}$," should read -- —Si($R^1$)$_\alpha$(OR$^2$)$_{3-\alpha}$, --.
Line 33, "—CO—NR$^f$—(CH$_2$)$_q$," should read -- —CO—NR'—(CH$_2$)$_q$, --.
Line 37, "R$^{\prime f}$ is H, C$_1$-C$_4$ alkyl" should read -- R' is H, C$_1$-C$_4$ alkyl --.
Line 47, "1) —(CF$_2$O)$_{a'}$–(C$_2$F$_4$O)$_{b'}$–," should read -- 1) —(CF$_2$O)$_{a'}$— (C$_2$F$_4$O)$_{b'}$—,--.
Line 62, "—(C$_3$F$_5$O)$_r$—(CFXO)$_{t'}$—CF$_2$(R'f)$_y$—CF$_2$O— (CFXO)$_{t'}$" should read -- — (C$_3$F$_6$O)$_r$—(CFXO)$_{t'}$—CF$_2$(R'f)$_y$—CF$_2$O— (CFXO)$_{t'}$ --.
Line 63, "t' is larger thin 0," should read -- t' is larger than 0, --.

This certificate supersedes Certificate of Correction issued September 27, 2005.

Signed and Sealed this

Twenty-eighth Day of February, 2006

JON W. DUDAS
*Director of the United States Patent and Trademark Office*